(12) United States Patent
Beinhofer et al.

(10) Patent No.: US 11,559,899 B2
(45) Date of Patent: Jan. 24, 2023

(54) METHOD AND DEVICE FOR PICKING GOODS

(71) Applicant: TGW Logistics Group GmbH, Marchtrenk (AT)

(72) Inventors: Maximilian Beinhofer, Thalheim bei Wels (AT); Harald Johannes Schroepf, Wels (AT)

(73) Assignee: TGW Logistics Group GmbH, Marchtrenk (AT)

( * ) Notice: Subject to any disclaimer, the term of this patent is extended or adjusted under 35 U.S.C. 154(b) by 756 days.

(21) Appl. No.: 16/476,154

(22) PCT Filed: Jan. 16, 2018

(86) PCT No.: PCT/AT2018/060012
§ 371 (c)(1),
(2) Date: Dec. 6, 2019

(87) PCT Pub. No.: WO2018/132855
PCT Pub. Date: Jul. 26, 2018

(65) Prior Publication Data
US 2020/0269432 A1    Aug. 27, 2020

(30) Foreign Application Priority Data
Jan. 18, 2017 (AT) .............................. A 50032/2017

(51) Int. Cl.
*B25J 9/16* (2006.01)
*B25J 9/00* (2006.01)
(Continued)

(52) U.S. Cl.
CPC ........... *B25J 9/1697* (2013.01); *B25J 9/0093* (2013.01); *B25J 15/0441* (2013.01);
(Continued)

(58) Field of Classification Search
CPC .... B25J 9/1697; B25J 9/0093; B25J 15/0441; B25J 19/023; B65G 1/1373;
(Continued)

(56) References Cited

U.S. PATENT DOCUMENTS 6,059,092 A * 5/2000 Jerue .................... B65G 1/1375
198/364
9,120,622 B1 * 9/2015 Elazary .................. B25J 9/1697
(Continued)

FOREIGN PATENT DOCUMENTS

DE   10 2010 002 317 A1   8/2011
DE   10 2011 053 547 A1   3/2013
(Continued)

OTHER PUBLICATIONS

International Search Report in PCT/AT2018/060012, dated May 8, 2018.

*Primary Examiner* — Thomas Randazzo
(74) *Attorney, Agent, or Firm* — Collard & Roe, P.C.

(57) ABSTRACT

A method for picking objects is specified, in which at least one object is removed from a source loading aid and placed into a target loading aid using a robot. After the operation of removing the object, a first sensor system of the robot is used to check whether at least one object is held by the robot. A number and/or a type of the at least one removed object is ascertained using the second sensor system. The operation of placing the at least one object into the target loading aid is aborted or modified if no object is held by the robot or the number and/or the type of the at least one removed object does not contribute to completing the picking order, which defines a desired number and/or desired type of objects in the target loading aid. Furthermore, a device and a computer program product for performing the presented method is specified.

41 Claims, 2 Drawing Sheets

(51) Int. Cl.
*B25J 19/02* (2006.01)
*B65G 1/137* (2006.01)
*B25J 15/04* (2006.01)

(52) U.S. Cl.
CPC .......... *B25J 19/023* (2013.01); *B65G 1/1373* (2013.01); *B65G 1/1376* (2013.01); *B65G 2203/0258* (2013.01); *B65G 2203/041* (2013.01); *B65G 2203/046* (2013.01)

(58) Field of Classification Search
CPC .......... B65G 1/1376; B65G 2203/0258; B65G 2203/041; B65G 2203/046
See application file for complete search history.

(56) References Cited

U.S. PATENT DOCUMENTS

| | | | | |
|---|---|---|---|---|
| 9,381,645 | B1* | 7/2016 | Yarlagadda | B65G 1/1378 |
| 9,996,805 | B1* | 6/2018 | Lisso | B65B 57/14 |
| 10,350,755 | B2* | 7/2019 | Wagner | B25J 9/1697 |
| 10,625,305 | B2* | 4/2020 | Wagner | B25J 9/1694 |
| 2005/0206520 | A1* | 9/2005 | Decker | G06Q 10/10 340/539.22 |
| 2011/0153065 | A1 | 6/2011 | Tomioka et al. | |
| 2013/0073076 | A1* | 3/2013 | Mathi | B65G 1/1376 700/216 |
| 2013/0110280 | A1* | 5/2013 | Folk | B25J 9/1697 700/215 |
| 2014/0244026 | A1* | 8/2014 | Neiser | B65G 1/1378 700/216 |
| 2014/0277694 | A1 | 9/2014 | Ichimaru | |
| 2015/0032252 | A1 | 1/2015 | Galluzzo et al. | |
| 2015/0057793 | A1* | 2/2015 | Kawano | G06Q 10/087 700/216 |
| 2015/0081090 | A1* | 3/2015 | Dong | B25J 15/065 700/230 |
| 2015/0127161 | A1* | 5/2015 | Satou | B25J 9/1697 700/259 |
| 2015/0134110 | A1* | 5/2015 | Koyanagi | B65G 47/46 700/248 |
| 2016/0151916 | A1* | 6/2016 | Kanno | B25J 9/1697 700/228 |
| 2016/0244262 | A1* | 8/2016 | O'Brien | B65G 1/1378 |
| 2017/0106532 | A1* | 4/2017 | Wellman | B25J 9/1664 |
| 2017/0137223 | A1* | 5/2017 | Lert, Jr. | B65G 1/065 |
| 2019/0185267 | A1* | 6/2019 | Mattern | B65B 5/105 |

FOREIGN PATENT DOCUMENTS

| | | | |
|---|---|---|---|
| DE | 10 2014 016 032 A1 | 5/2015 | |
| EP | 2650237 A1 * | 10/2013 | .......... B65G 1/1378 |
| EP | 2 783 810 A2 | 10/2014 | |

* cited by examiner

METHOD AND DEVICE FOR PICKING GOODS

The invention relates to a method for picking goods and/or objects, in which a) at least one object is removed from a source loading aid with the help of a robot and b) the at least one object is placed in a target loading aid and/or introduced into the latter with the help of said robot, wherein c) after removing the object from the source loading aid it is checked with the help of a first sensor system whether at least one object is held by the robot. The invention further relates to a device for picking goods and/or objects, comprising a robot having means for removing at least one object from a source loading aid and for placing the at least one object into a target loading aid, as well as a provisioning device for provisioning the source loading aid and the target loading aid within a range of action or arm sweep of the robot. In addition the device comprises a first sensor system for checking whether at least one object is held by the robot. Finally the invention also relates to a computer program product having a computer program stored on it, which is loadable into a computer of a device of the above-mentioned kind and executes there a method according to the above-mentioned kind if the computer program is executed there.

A method and a device of the mentioned kind are known in principle from the prior art. For example, a sensor can be disposed at the or within the gripper of a robot, which sensor checks whether or not an object is actually held by the robot. The sensors used to date, however, are suited only for comparatively simple tasks and are not suitable to guarantee a faultless or largely faultless running of a relatively complex picking process.

It is therefore one object of the invention to specify an improved method and an improved device for picking goods and/or objects. If possible the method is to be able to be executed independently by a robot, and there is to be no or merely little need for intervention by a human.

The object of the invention is achieved by a method of the kind mentioned at the beginning, in which d) a number and/or a type of the at least one removed object is ascertained with the help of a second sensor system and e) the process for placing the at least one object into the target loading aid is aborted or modified if the check using the first sensor system reveals that e1) no object is held by the robot or, e2) while at least one object is held by the robot, the check carried out using the second sensor system, however, reveals that the number and/or the type of the at least one object removed from the source loading aid does not contribute to completing a picking order, which defines a desired number and/or desired type of objects in the target loading aid.

The object of the invention is moreover achieved by a device of the kind mentioned at the beginning, additionally comprising a second sensor system for determining a number and/or a type of the at least one removed object and a control configured to abort or modify a process for placing the at least one object into the target loading aid if the check using the first sensor system reveals that no object is held by the robot or that, while at least one object is held by the robot, the check carried out using the second sensor system, however, reveals that the number and/or the type of the at least one object removed from the source loading aid does not contribute to completing the picking order, which defines a desired number and/or desired type of objects in the target loading aid.

Finally, the object of the invention is achieved by a computer program product having a computer program stored on it, which is loadable into a computer of a device of the above-mentioned kind and executes there a method according to the above-mentioned kind if the computer program is executed there.

Therefore, the robot executes a picking process during which it fills for example a shipping carton serving as a target loading aid with the goods and/or objects ordered by a customer, either with one (single) run through steps a) to e) or by recursive repeating of said steps a) to e). During each run it is checked whether the number and/or the type of the objects removed from the source loading aid contributes to completing a picking order, i.e. whether the number of the at least one object removed from the source loading aid is smaller than or equal to the difference between the desired number and the actual number of the objects contained in the target loading aid. Additionally or alternatively the types of the objects removed from the source loading aid are to correspond to the objects still missing in the target loading aid. The robot can for example be provided as a gantry robot or as a multiple-axis robot/articulated robot (industrial robot).

The "type of object" or "kind of object" is determined by object properties. An object property can be for example the color or a gray-scale value of the object, a geometrical shape (spherical, cuboid, bottle-shaped, etc.), a weight and/or a dimension (length, width, height, etc.). To determine a type of object/kind of object, any set of object properties can be used, for example comprising only one of the object properties listed above, or any combination of the latter. Accordingly, the set of object properties can cover any area of the available object properties. The terms "type of object" and "kind of object" can be used synonymously within the scope of this disclosure.

The means for the operation of removing and for the operation of placing the at least one object can for example be formed by a pliers-like or hand-like gripper, or by a vacuum gripper, or by any combination of these grippers. Moreover, in an advantageous design of the presented device the first sensor system can be disposed at the robot. The first sensor system can comprise an ultrasonic sensor and/or, provided that the robot is equipped with a vacuum gripper, a vacuum sensor. In particular, a vacuum sensor can be provided for each vacuum gripper. For example, three vacuum sensors (for three vacuum grippers) and one ultrasonic sensor can be provided in the first sensor system. The first sensor system can also have an RFID reading device, a camera and/or a weighing scale/a force sensor. It should be noted in this context that the operation of "placing" an object comprises within the scope of the invention also the targeted dropping of an object. For example, objects can be dropped (from a low height) into or onto the target loading aid as part of the placing process.

A loading aid can be for example a case, in particular of plastic, a box (e.g. of carton), a bag, a sack, a tray, a pallet, a basket or similar.

The presented invention is suited in particular for picking a customer order, but it is in principle not limited to this. A picking process within the scope of the invention can generally also comprise the operation of manipulating or packing goods and/or objects, for example at the goods-in point of a storage system. For example, the presented invention can be used to repack objects from incoming source loading aids into target loading aids, which are then brought into an (automated) store, and/or generally to reload objects from a source loading aid into a target loading aid.

If the operation of completing the picking process by the robot fails even after several attempts, it can be provided that the operation of completing the picking process is carried out by another robot or by a human. For example, this may be the case if merely one object is missing to complete the picking process but the robot repeatedly grasps several objects. The number of attempts until abortion can be required. The operation of completing the picking process by another robot or by a human need not be carried out on location but can also be carried out at a different site. For example, the source loading aid and the target loading aid are conveyed to that end to a robot of a special type, which is able to master even difficult situations.

The term "provisioning device" is to be understood broadly and includes in particular a conveying device for supplying the source loading aid within a range of action of the robot and for transporting the target loading aid out of the range of action of the robot. The term "conveying device" includes in particular stationary conveyors (e.g. roller conveyors) as well as (autonomous) industrial trucks.

Other advantageous designs and further developments of the invention become apparent from the dependent claims as well as from the description in combination with the figures.

It is advantageous if in the case e1) it is continued directly with step a). Accordingly, the placing process is instantly aborted if it is established that no object at all is held by the robot. The picking method is therefore particularly time-efficient.

It is further advantageous if in the case e2) all objects held by the robot are placed in the source loading aid and it is continued with step a). In this variant of the presented picking method the removal process is repeated until the objects removed from the source loading aid contribute to completing the picking order. The picking method, therefore, is particularly simple in terms of program technology and/or control technology.

It is moreover advantageous if in the case e2) all objects held by the robot are placed at a placing position different from the source loading aid and from the target loading aid, an object intended for the target loading aid is seized and placed in the target loading aid and an object not intended for the target loading aid is seized and placed in the source loading aid, and subsequently it is continued with step a). In this variant of the presented picking method the objects held by the robot but in total not contributing to completing the picking order are placed at a placing position and/or in a rectification area and sorted with regard to whether or not the former contribute to completing the picking order. Non-contributing objects are conveyed back into the source loading aid, contributing objects into the target loading aid. The running of the picking method is therefore particularly efficient. The operation of placing the objects not intended for the target loading aid into the source loading aid is advantageous but not mandatory. It is also conceivable that said objects are handled differently. For example, the former can initially remain in the rectification area and from there be sorted back into a store, for example, at a later point in time. It is also conceivable that another (third) loading aid is provided in the rectification area, into which said objects are placed and using which the latter are transported back into a store, for example.

It is advantageous in addition if in the case e2) all objects held by the robot are placed in the target loading aid, an object not intended for the target loading aid is removed from the target loading aid and placed in the source loading aid, and subsequently it is continued with step a). In this variant of the presented picking method the placing process is performed in any case. If it is subsequently established that the target loading aid contains, among others, objects that do not contribute to completing the picking process, these objects are then removed again from the target loading aid and placed in the source loading aid.

In another advantageous variant of the presented picking method the objects are equipped with radio identification tags, RFID tags in short, and the second sensor system has a first RFID reading device for these RFID tags, whose reading range comprises the source loading aid while excluding (in particular temporarily) the target loading aid and a holding range of the robot, and the number and/or the type of the at least one object removed from the source loading aid is ascertained with the help of a piece of information read out from the RFID tag using the first RFID reading device and/or the second sensor system has a second RFID reading device for these RFID tags, whose reading range comprises the target loading aid while excluding (in particular temporarily) the source loading aid and a holding range of the robot, and the number and/or the type of the at least one object placed into the target loading aid is ascertained with the help of a piece of information read out from the RFID tag using the second RFID reading device and/or the second sensor system has a third RFID reading device for these RFID tags, whose reading range comprises a holding range of the robot while excluding (in particular temporarily) the source loading aid and the target loading aid, and the number and/or the type of the at least one object held by the robot is ascertained with the help of a piece of information read out from the RFID tag using the third RFID reading device.

Accordingly, the second sensor system of the presented picking device comprises an RFID reading device for radio identification tags, RFID tags in short, whose reading range comprises the source loading aid, the target loading aid and/or a holding range of the robot. Advantageously, an RFID tag stores the type of the object at or in which the RFID tag is disposed, or said RFID tag stores a reference into a database in which said type is stored. The use of RFID tags allows for the number and/or type of objects located in the source loading aid, within the holding range of the robot and/or in the target loading aid to be ascertained particularly easily. In principle, all that is necessary to that end is to analyze the information stored on the RFID tags (e.g. type=whole milk 3.5%, weight=1 kg, width=7 cm, depth=7 cm, height=20 cm). In this way, it can be established which objects are removed from the source loading aid and which objects are placed in the target loading aid.

It is particularly advantageous if the objects contained in the source loading aid are acquired with the help of the first RFID reading device before and after the operation of removing the at least one object, and the number and/or the type of the at least one object removed from the source loading aid is determined by means of an ascertained difference of the objects acquired during the two reading processes and/or if the objects contained in the target loading aid are acquired with the help of the second RFID reading device before and after the operation of placing the at least one object, and the number and/or the type of the at least one object placed in the target loading aid is determined by means of an ascertained difference of the objects acquired during the two reading processes.

In this variant of the picking method the objects held by the robot and/or the objects placed by it are ascertained via the subtraction of two reading processes. Therefore, means for ascertaining the number and/or the type of objects need not be provided at the robot itself.

It is also particularly advantageous if a third RFID reading device for RFID tags disposed at a moving part of the robot
is moved toward the source loading aid in order to acquire the objects contained in the source loading aid and/or
is moved toward the target loading aid in order to acquire the objects contained in the target loading aid and/or
is moved away from the source loading aid and from the target loading aid in order to acquire the objects held within the holding range by the robot.

In this variant of the picking method only one single RFID reading device is needed in principle in order to identify the objects located in the source loading aid, in the target loading aid and within the holding range. In this case, the RFID reading device is aligned and/or positioned with the help of the robot in such a way that it can acquire only the respective objects located in the source loading aid, in the target loading aid or within the holding range.

In another advantageous embodiment variant of the presented picking method the second sensor system has a camera and/or a 3D sensor and/or a 3D detection system, and
the number and/or the type of the at least one object removed from the source loading aid is ascertained by a comparison of an image of a content of the source loading aid acquired before and of an image of a content of the source loading aid acquired after the removal process and/or
the number and/or the type of the at least one object placed in the target loading aid is ascertained by a comparison of an image of a content of the target loading aid acquired before and of an image of a content of the source loading aid acquired after the placing process and/or
the number and/or the type of the at least one object held by the robot is ascertained by means of an image acquired of the holding range of the robot.

Similarly to using RFID reading devices, the number and/or the type of the objects removed from the source loading aid, located within the holding range and/or placed in the target loading aid are ascertained via subtraction of two acquisition processes, in this case by acquiring two images at different points in time and/or in different states of the picking device.

In another advantageous variant of the presented picking method
the source loading aid is weighed with the help of a weighing scale before and after the operation of removing the at least one object, which weighing scale is comprised by the second sensor system, and the number and/or the type of the at least one object removed from the source loading aid is ascertained by means of a measured weight difference, and/or
the target loading aid is weighed with the help of a weighing scale before and after the operation of placing the at least one object, which weighing scale is comprised by the second sensor system, and the number and/or the type of the at least one object placed in the target loading aid is ascertained by means of a measured weight difference, and/or
a weight held by the robot is measured with the help of a weighing scale (in particular with the help of a weighing or force sensor disposed at the robot) before and after the operation of removing the at least one object, which weighing scale is comprised by the second sensor system, and the number and/or the type of the at least one object held by the robot is ascertained by means of a measured weight difference.

In particular, in this case,
a weight of an object of a type contained in the source loading aid is known, and
the number and/or the type of the at least one object removed from the source loading aid and/or placed in the target loading aid and/or held by the robot is ascertained by seeking a combination of objects contained in the source loading aid whose total weight is essentially equal to the weight difference.

In this variant of the picking process it is assumed that the weight of an object contained in the source loading aid is known. For example, the former is reported to a superordinate computer or ascertained by the latter upon receiving goods. It can generally be assumed that the objects contained in a loading aid are known in principle in terms of type and number in a goods storage system of a known type. This information can subsequently be used to identify the objects removed from the source loading aid, the objects located within the holding range and/or the objects placed in the target loading aid. The term "essentially" in the given context means a deviation of ±10% from the reference value.

Specifically, the weight difference is divided by the total weight of each combination of objects contained in the source loading aid up to a total number of five objects or up to a total number of objects which can be removed by the robot from the source loading aid during a removal process, and the sought combination is the one allocated the value closest to one. The total number of objects which can be removed by the robot from the source loading aid during a removal process—provided that the former is known—can be used as a basis for the computation. If this total number is not known, a total number of five objects—assuming that the robot cannot remove more objects from the source loading aid—can be used as a basis for the computation. If the objects in the source loading aid are homogeneous and thus all have the same weight, the number of the objects removed from the source loading aid and/or the number of the objects placed in the target loading aid and/or the number and/or the type of the objects held by the robot can be ascertained simply by means of a division of the measured weight difference by the weight of one object.

It is also particularly advantageous if the total weight of every combination of objects up to a total number of five objects or up to a total number of objects which can be removed by the robot from the source loading aid during a removal process is different. In this way it is ensured that every combination of objects has an unambiguous total weight and there is no combination of objects which have (essentially) the same total weight. The objects removed from the source loading aid, located within the holding range and/or placed in the target loading aid can thus be identified unambiguously. However, in principle the presented picking method also works if not every combination of objects has an unambiguous total weight. If applicable, in this case, troubleshooting according to the case e2) is to be performed. A trivial case for unambiguous total weights is given whenever the source loading aid contains only one type of objects.

Advantageously, it is proceeded in the same way as after the case e2) occurred if the value closest to one has a deviation from one which is above a first threshold or a deviation from the second-closest value which is below a second threshold. In this way, it can be checked whether the ascertained quotient is sufficiently close to one and the ascertained result is therefore certain or whether the deviation of the quotient from one is relatively large and the ascertained result is therefore uncertain. For the same purpose the distance to the quotient second-closest to one can additionally or alternatively be ascertained. If the distance is too small, it cannot be stated with certainty which of the two quotients (namely the quotient closest or the one second-closest to one) is the right one, i.e. specifies the objects actually removed from the source loading aid. If the distance is sufficiently large, the quotient closest to one will actually specify the objects removed from the source loading aid.

It is also particularly advantageous if it is proceeded in the same way as after case e2) occurred and/or an alarm is emitted if
  a comparison of the ascertained number and/or the ascertained type of the at least one object removed from the source loading aid reveals a deviation to the ascertained number and/or the ascertained type of the at least one object held by the robot and/or
  a comparison of the ascertained number and/or the ascertained type of the at least one object removed from the source loading aid reveals a deviation to the ascertained number and/or the ascertained type of the at least one object placed in the target loading aid and/or
  a comparison of the ascertained number and/or the ascertained type of the at least one object held by the robot reveals a deviation to the ascertained number and/or the ascertained type of the at least one object placed in the target loading aid.

In this way, it can be checked whether all objects removed by the robot from the source loading aid were actually placed in the target loading aid or whether a deviation is established and therefore objects have unintentionally dropped off the robot or gone otherwise missing on the way. It should be noted in this context that an alarm can comprise not only directly perceptible acoustic and/or optical signals, but it can also be understood to mean messages to a superordinate computer.

In another advantageous variant of the presented method the robot is instructed with respect to the removal process to remove an exact number of objects and/or a specific object or specific objects from the source loading aid. In this way, the running of the picking process is easily plannable and/or predictable. In the normal situation and without occurrence of an unforeseen event, the robot will always remove those objects from the source loading aid which contribute to completing the picking order. In principle the outcome of the check according to item e2) is independent of whether the number of removed objects is actually identical with the required number of objects. Even an "error" during removal can be useful for completing an order. For example, instead of one required object two objects could actually have been seized. However, if two or more objects are still missing to complete an order anyway, the operation of placing the excess objects seized into the target container is nevertheless expedient. The process for placing the at least one object into the target loading aid then need not be aborted or modified.

It is furthermore favorable if the robot is instructed with respect to the removal process to remove the at least one object from the source loading aid at an exact position and/or place it in the target loading aid at an exact position. This measure, too, ensures that the running of the picking process remains easily plannable and/or predictable. If the robot cannot fulfill the requirement, it can be provided that it attempts, within a required number of repetitions, to fulfill the requirement. Alternatively or additionally it can be provided that the robot attempts to fulfill the requirement with the next object.

The proposed measures can also be combined, so that the robot is instructed to pick up an exact number of objects from an exact local position from the source loading aid and/or place the former at an exact local position into or onto the target loading aid.

However, it is also favorable if the robot is instructed with respect to the removal process to remove any number of objects and/or any object or any objects from the source loading aid. This can also be limited to a range. For example, it can be provided that the robot is instructed with respect to the removal process to remove any number of objects out of a range of numbers (i.e. for example 1 to 3 objects) and/or any object or any objects out of a range of types of object and/or kinds of object (i.e. for example green and yellow objects but not blue objects) from the source loading aid. The proposed measures ensure that the removal process can be performed in an easy manner in terms of program technology and/or control technology, as the former is not bound to requirements. A check with regard to whether the number and/or the type of an object removed from the source loading aid contributes to completing a picking order is carried out in this variant in principle only after removal of the objects from the source loading aid.

It is furthermore favorable if the robot is instructed with respect to the removal process to remove the at least one object from the source loading aid at any position and/or place it in the target loading aid at any position. This ensures that the removal process and/or placing process can be performed in an easy manner in terms of program technology and/or control technology, as the former is not bound to requirements. It is also conceivable that the removal position and/or placing position is limited to a local area. For example, it can be provided that the robot is instructed with respect to the removal process to remove an object from an area of the source loading aid (for example from the top left corner) and/or place an object into an area of the target loading aid (for example centered).

The proposed measures can also be combined, so that the robot is instructed to pick up any number of objects (in particular any number out of a given range of numbers), any kinds of objects (in particular out of a given range of types of object/kinds of object—for example there can be green, red and blue types of object/kinds of object, of which said range can comprise for example green and red objects) from any position (in particular from a local area) from the source loading aid and/or place the former at any position (in particular in a local area) into or onto the target loading aid.

Generally the position at which an object is removed from the source loading aid and the position at which an object is placed in the target loading aid, and also the position at which an object is picked up from a rectification area, can be determined with the help of a camera and/or a 3D sensor/3D detection system. Even the removal process or placing process itself can be monitored with the help of a camera and/or a 3D sensor/3D detection system. The camera and/or the 3D sensor/3D detection system can be part of the first or second sensor system, or they can form an independent system. In the latter case, the camera and/or the 3D sensor/3D detection system are intended to define the removal position (gripping position)/placing position but not to establish a number/type of the removed objects. The check of the removal process or placing process can be carried out several times per second.

Advantageously, the source loading aid contains only one type of objects (i.e. the objects in the source loading aid are homogeneous). In this variant, a check of the type of objects will be obsolete for the picking process, as the type of objects contained in the respective source loading aids is known, for example to a superordinate computer.

It is favorable if the first sensor system determines merely a state of occupancy of the holding range of the robot by at least one object. That means that the first sensor system merely distinguishes between no object and at least one object being held by the robot and/or being present within the holding range and can therefore have a simple technical structure.

It is furthermore favorable if the check using the first sensor system is carried out only once per run through the steps a) to e). In this way, the presented method requires only little computing power.

However, it is also favorable if the check using the first sensor system is carried out several times per run through the steps a) to e). In this way, it can be established in particular swiftly whether the robot inadvertently dropped an object and thus the case e1) occurs.

It is furthermore favorable if the second sensor system is disposed at the robot, in particular at a moving part of the robot. The second sensor system in this variant can be configured in such a way that it acquires only the holding range of the robot and/or in such a way that it can acquire the source loading aid and the target loading aid if the second sensor system is moved toward them. In this case the second sensor system can have in particular an RFID reading device or a camera. In principle, however, the use of a weighing scale moved by the robot is also possible. For example, the gravitational force held by the robot can be ascertained by an appropriate sensor. When the source loading aid or the target loading aid is now lifted by the robot, the weight of the objects contained therein can be ascertained. Evidently, also the weight of objects located within the holding range can be ascertained with the help of said sensor.

Finally, it is also favorable if the second sensor system is stationary and acquires the source loading aid and/or target loading aid. In this case, separate second sensors can be provided for the source loading aid and the target loading aid, or a joint sensor is provided, for example a camera, an RFID reading device or a weighing scale, which can acquire both the source loading aid and the target loading aid. It would also be conceivable that the joint sensor can be moved away from the source loading aid or from the target loading aid, or that the source loading aid or the target loading aid is moved away from the joint sensor (for example with the help of a conveying device) in order to enable a measurement directed only at the source loading aid or only at the target loading aid. In principle it is also conceivable that the holding range of the robot can be acquired by the stationary second sensor system if the former is moved toward there.

It is also particularly advantageous if the presented device has a
- fixed, level and horizontal connecting surface or
- fixed connecting surface inclined toward the source loading aid or the target loading aid or
- fixed connecting surface inclined toward the placing position or
- movable connecting surface/flap inclinable toward the source loading aid or toward the target loading aid or toward the placing position, disposed between the source loading aid and the target loading aid.

In this way, objects which inadvertently dropped off the robot can be more easily kept in the further operation of running for picking or be reintegrated into the latter. By means of an inclined connecting surface, objects which inadvertently dropped off will automatically slide to one of the required locations, i.e. to the source loading aid, to the target loading aid or to the placing position/to the rectification area (and/or into a container placed there). It would also be conceivable that the connecting surface is aligned levelly and/or horizontally, so that under normal circumstances objects which dropped off the robot remain there and can be picked up again by the robot. The connecting surface can also be disposed sprung spring-mounted. The connecting surface can also extend circularly around the source loading aid and/or circularly around the target loading aid and/or circularly around a container disposed at the rectification area and encircle the latter or the former. If a flap is provided, the above-mentioned options can be combined, i.e. the flap can in a horizontal position serve as placing position/rectification area and in a fold-up position convey the dropped object to a required location, i.e. to the source loading aid, to the target loading aid or to the placing position/to the rectification area (and/or into a container placed there). The flap can have a swiveling axis or axis of rotation, or several, which can be activated as needed. In this way, one and the same flap can for example be swiveled to the source loading aid or to the target loading aid or to the placing position. The separately activatable swiveling axes or axes of rotation can be formed for example by electromagnetically-shiftable bolts, each of which has an idle position and an engaged position. The flap can in addition have its own drive, which is supplied for example electrically, pneumatically or hydraulically. However, the flap can also be moved by the robot, in particular by the latter's gripper. It is particularly advantageous about the swivelable flap that dropped (and in some circumstances difficult-to-pick-up/grip) objects need not be seized by the gripper of the robot but simply slide to the required position. When an object drops onto the connecting surface or flap, a modification of the process for placing the at least one object into the target loading aid (according to step e) could therefore comprise the operation of picking up the object from the connecting surface or the operation of swiveling up the flap.

The area of the connecting surface and/or flap can be monitored with the help of at least one sensor (for example a camera and/or a 3D sensor/3D detection system and/or a weighing scale). In this way, a position, location, number and kind of the objects which dropped from the robot can be determined. The camera and/or the 3D sensor/3D detection system can be part of the first or second sensor system, or they can form an independent third sensor system. The check of the area of the connecting surface and/or flap can be carried out several times per second.

In a variant of the presented device the connecting surface or the flap itself forms the rectification area. This means that objects can also be intentionally placed there on the connecting surface or the flap. In this case, too, a modification of the process for placing the at least one object into the target loading aid (according to step e) could comprise the operation of picking up the object from the connecting surface, the operation of placing an object on an inclined connecting surface (slide) or the operation of swiveling up the flap.

It should also be noted in this context that the presented embodiment variants of the presented device and the resulting advantages analogously relate to the disclosed method and vice versa.

For the purpose of better understanding of the invention, it will be elucidated in more detail by means of the figures below.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position. Furthermore, also individual features or feature combinations from the different exemplary embodiments shown and described may represent independent inventive solutions or solutions in accordance with the invention.

Figure 1:
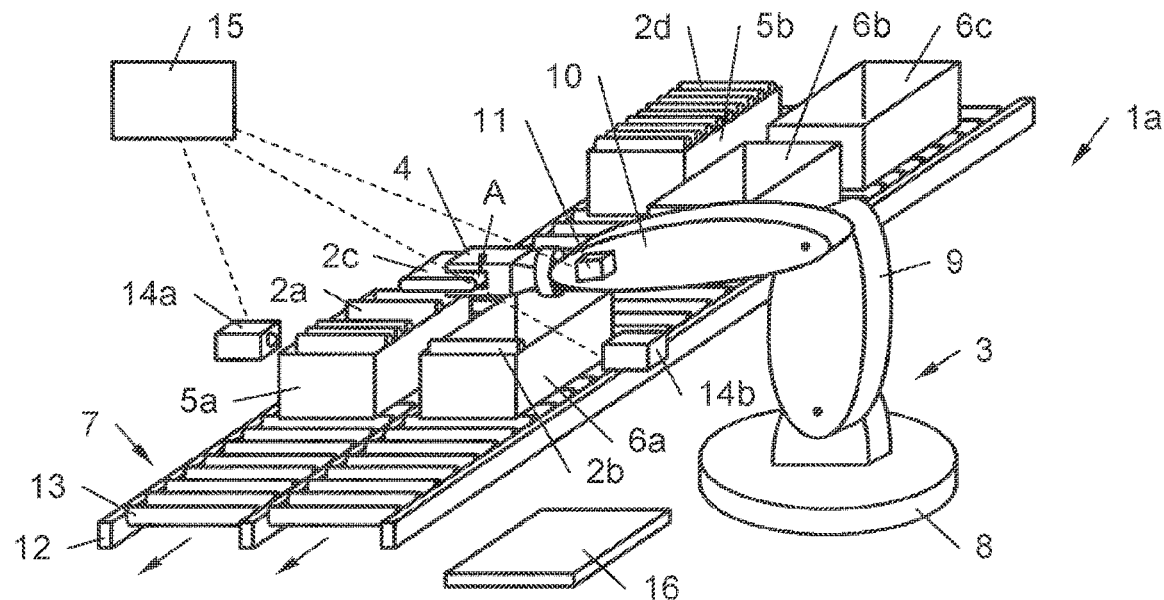
FIG. 1 shows a first example of a device for picking goods, in which objects located in the source loading aid, target loading aid and within the holding range of the robot are acquired with the help of RFID reading devices.

FIG. 1 shows a first example of a device 1a for picking goods and/or objects 2a . . . 2d, which comprises a robot 3 having means 4 for removing at least one object 2a . . . 2d from a source loading aid 5a, 5b and for placing the at least one object 2a . . . 2d in a target loading aid 6a . . . 6c, as well as a conveying device 7 for supplying the source loading aid 5a, 5b into a range of action of the robot 3 and for transporting the target loading aid 6a . . . 6c out of the range of action of the robot 3. The conveying device 7 thus simultaneously forms a provisioning device for provisioning the source loading aid 5a, 5b and the target loading aid 6a . . . 6c within a range of action of the robot 3.

The robot 3 comprises in this example a robot base 8, a first movable robot arm 9, a second movable robot arm 10 as well as a gripper 4, which here forms the means 4 for the operation of removing/placing at least one object 2a . . . 2d. The gripper 4 can be configured pliers-shaped. In addition a first sensor system 11 is provided for checking whether at least one object 2a . . . 2d is held by the robot 3. The first sensor system 11 is in this example disposed on the robot 3. In principle the first sensor system 11 can, however, also be disposed at a different location of the device 1a.

The design of the robot 3 as a multiple-axis robot/articulated robot and/or industrial robot shown in FIG. 1 is purely exemplary. Instead, the robot 3 could also be configured as a gantry robot or even as a mixed form of the two designs. In addition the gripper 4 could also be configured finger- and/or hand-like. Moreover, instead of the gripper 4, or in addition to the former, also other means for the operation of removing/placing at least one object 2a . . . 2d could be provided, for example a suction gripper (vacuum gripper) or several suction grippers.

The first sensor system 11, which is depicted in FIG. 1 purely symbolically, could for example comprise an ultrasonic sensor and/or, provided that the robot 3 is equipped with a vacuum gripper, a vacuum sensor. The first sensor system 11 can in particular also be configured to acquire only a state of occupancy of the holding range A of the robot 3 by at least one object 2a . . . 2d. That means that the first sensor system 11 merely distinguishes between no object 2a . . . 2d or at least one object 2a . . . 2d being held by the robot 3 and/or being present within the holding range A.

The conveying device 7 for supplying a source loading aid 5a, 5b and for transporting away a target loading aid 6a . . . 6c into the range of action or arm sweep of the robot 3 is in this example configured as a roller conveyor having two conveyor tracks of a design which is known per se, which has frame profiles 12 with conveyor rollers 13 disposed between them. The specific depicted design of the conveying device 7 is equally purely exemplary. For example, the source loading aids 5a, 5b and target loading aids 6a . . . 6c could also be transported in a different manner, for example on conveyor belts or with the help of industrial trucks, in particular with the help of autonomous industrial trucks. The conveyor tracks could moreover also be disposed differently than it is depicted in FIG. 1.

The device 1a further comprises a second sensor system 14a, 14b as well as a control 15, which is connected to the first sensor system 11 and to the second sensor system 14a, 14b, as is indicated by dashed lines in the FIG. 1. The mentioned connection can be wire-bound or carried out wirelessly.

The first sensor system comprises in this example an ultrasonic sensor 11, and the second sensor system comprises a first RFID reading device 14a and a second RFID reading device 14b.

Finally the device 1a also comprises a placing position and/or a rectification area 16, which is disposed at a position different from source loading aids 5a, 5b and target loading aids 6a . . . 6c.

Specifically, in the FIG. 1 a first source loading aid 5a and a first target loading aid 6a are located within the range of action of the robot 13. The further source loading aid 5b and the further target loading aids 6b, 6c are conveyed into the range of action of the robot 13 at a later point in time (see also the conveying direction specified by means of arrows in FIG. 1). Furthermore, in the FIG. 1 specifically a first object 2a is located in the first source loading aid 5a, a second object 2b in the first target loading aid 6a, a third object 2c within the holding range of the robot 13 and a fourth object 2d in the second source loading aid 5b.

During the running of the picking method, however, also the second source loading aid 5b and the third target loading aid 6c can for example come within the range of action of the robot 13. Then, also the fourth object 2d can come within the holding range A or into the third target loading aid 6c.

At different points in time the source loading aids 5a, 5b, the target loading aids 6a . . . 6c and the objects 2a . . . 2d are thus in different places. Therefore, all source loading aids 5a, 5b, target loading aids 6a . . . 6c and objects 2a . . . 2d will each be referenced below, i.e. it will be specified for example that the object "2a . . . 2d" is within the holding range A, even if this actually only applies to the third object 2c with respect to the state depicted in the FIG. 1.

Furthermore it should be noted that, in particular with regard to the source loading aids 5a, 5b, target loading aids 6a . . . 6c and objects 2a . . . 2d, the singular and plural is used interchangeably. Generally, one object 2a . . . 2d or several objects 2a . . . 2d can be picked from one or several source loading aid(s) 5a, 5b into one or several target loading aid(s) 6a . . . 6c. The conveying direction of the conveying device 7 can also be reversed to that end.

The functioning of the device 1a depicted in the FIG. 1 is as follows:

In a first step a) at least one object 2a ... 2d is removed from the source loading aid 5a, 5b with the help of the robot 3. After removing the object 2a ... 2d from the source loading aid 5a, 5b, it is checked with the help of the first sensor system 11 whether at least one object 2a ... 2d is held by the robot 3 (step c). With the help of the second sensor system 14a, 14b a number and/or a type of the at least one removed object 2a ... 2d is ascertained.

If the check reveals that the number and/or the type of the at least one object 2a ... 2d removed from the source loading aid 5a, 5b contributes to completing a picking order, which defines a desired number and/or desired type of objects 2a ... 2d in the target loading aid 6a ... 6c, the at least one object 2a ... 2d is placed in the target loading aid 6a ... 6c (step b).

If the check using the first sensor system 11 reveals that no object 2a ... 2d is held by the robot 3 (case e1) or that, while at least one object 2a ... 2d is held by the robot 3, the check carried out using the second sensor system 14a, 14b, however, reveals that the number and/or the type of the at least one object 2a ... 2d removed from the source loading aid 5a, 5b does not contribute to completing the picking order (case e2), the process for placing the at least one object 2a ... 2d in the target loading aid 6a ... 6c will be aborted or modified.

Specifically, this can be carried out by continuing in the case e1) directly with step a). Accordingly, the placing process is instantly aborted if it is established that no object 2a ... 2d at all is held by the robot 3. The picking method is therefore particularly time-efficient.

In the case e2) this can also be carried out by all objects 2a ... 2d held by the robot 3 being placed in the source loading aid 5a, 5b and by continuing with step a). Accordingly, the removal process in this variant of the presented picking method is repeated until such time as the objects 2a ... 2d removed from the source loading aid 5a, 5b contribute to completing the picking order. The picking method, therefore, is particularly simple in terms of program technology and/or control technology.

Alternatively, in the case e2) all objects 2a ... 2d held by the robot 3 can be placed at a placing position 16 different from the source loading aid 5a, 5b and from the target loading aid 6a ... 6c. In a further step an object 2a ... 2d intended for the target loading aid 6a ... 6c is seized and placed in the target loading aid 6a ... 6c and an object 2a ... 2d not intended for the target loading aid 6a ... 6c is seized and placed in the source loading aid 5a, 5b. Subsequently, it is continued with step a). In this variant of the presented picking method the objects 2a ... 2d held by the robot 3 yet in total not contributing to completing the picking order are placed at a placing position 16 and/or in a rectification area and sorted with regard to whether or not the former contribute to completing the picking order. Objects 2a ... 2d not contributing to the order are conveyed back into the source loading aid 5a, 5b, contributing objects 2a ... 2d into the target loading aid 6a ... 6c. The running of the picking method is therefore particularly efficient.

The operation of placing the objects 2a ... 2d not intended for the target loading aid 6a ... 6c in the source loading aid 5a, 5b is advantageous but not mandatory. It is also conceivable that said objects 2a ... 2d are handled differently. For example, the former could initially remain at the placing position 16 and from there be stored into a store, for example, at a later point in time. It is also conceivable that another (third) loading aid is provided at the placing position 16, into which said objects 2a ... 2d are placed and using which the latter are for example transported back into a store.

It is finally also conceivable that in the case e2) all objects 2a ... 2d held by the robot 3 are placed in the target loading aid 6a ... 6c, an object 2a ... 2d not intended for the target loading aid 6a ... 6c is removed from the target loading aid 6a ... 6c and placed in the source loading aid 5a, 5b, and subsequently it is continued with step a). In this variant of the presented picking method the placing process is performed in any case. If it is subsequently established that the target loading aid 6a ... 6c contains also objects 2a ... 2d which do not contribute to completing the picking process, these objects 2a ... 2d are then removed again from the target loading aid 6a ... 6c and placed in the source loading aid 5a, 5b.

The robot 3 therefore executes a picking process by filling for example a shipping carton serving as a target loading aid 6a ... 6c with the goods and/or objects 2a ... 2d ordered by a customer. This can be carried out with a run through the steps a) to e) or also by recursive repeating of said steps a) to e). During each run it is checked whether the number and/or the type of the objects 2a ... 2d removed from the source loading aid 5a, 5b contribute to completing a picking order, i.e. whether the number of the at least one object 2a ... 2d removed from the source loading aid 5a, 5b is smaller than or equal to the difference between the desired number and the actual number of the objects 2a ... 2d contained in the target loading aid 6a ... 6c. Additionally or alternatively the types of the objects 2a ... 2d removed from the source loading aid 5a, 5b should correspond to the types of the objects 2a ... 2d still missing in the target loading aid 6a ... 6c.

The running of the picking process, and in particular the check whether an object 2a ... 2d is held by the robot 3 and whether the number and/or the type of the at least one object 2a ... 2d removed from the source loading aid 5a, 5b contributes to completing a picking order, is done by the control 15, specifically in interaction with the first sensor system 11 and the second sensor system 14a, 14b.

The check using the first sensor system 11 is carried out in one variant of the presented method only once per run through the steps a) to e). In this way, the presented method requires only little computing power. However, it is also conceivable that the check using the first sensor system 11 is carried out several times per run through the steps a) to e). In this way, it can be established, in particular swiftly, whether the robot 3 inadvertently dropped an object 2a ... 2d and thus the case e1) occurs.

In the example depicted in FIG. 1 the objects 2a ... 2d are equipped with RFID tags, on which the type of an object 2a ... 2d is stored or a reference into a database, in which said type is stored.

The use of RFID tags allows for the number and/or the type of the objects 2a ... 2d located in the source loading aid 5a, 5b, within the holding range A of the robot 3 and/or in the target loading aid 6a ... 6c to be ascertained particularly easily. In principle, all that is necessary to that end is to analyze the information stored on the RFID tags (e.g. type=whole milk 3.5%, weight=1 kg, width=7 cm, depth=7 cm, height=20 cm). In this way, it can be established which objects 2a ... 2d are removed from the source loading aid 5a, 5b and which objects 2a ... 2d are placed in the target loading aid 6a ... 6c.

In the example depicted in FIG. 1 the reading range of the first RFID reading device 14a comprises the source loading aid 5a. The target loading aid 6a and the holding range A of the robot 3, however, is not acquired. Therefore, the information which is read out from the RFID tags using the first RFID reading device 14a can be used to ascertain the number and/or the type of the at least one object 2a . . . 2d removed from the source loading aid 5a.

Analogously, the reading range of the second RFID reading device 14b in the example depicted in FIG. 1 comprises the target loading aid 6a. The source loading aid 5a and the holding range A of the robot 3, however, is not acquired. Therefore, the information which is read out from the RFID tags using the second RFID reading device 14b can be used to ascertain the number and/or the type of the at least one object 2a . . . 2d placed into the target loading aid 6a.

The second sensor system 14a, 14b is stationary in this example, and an RFID reading device 14a, 14b each is provided for the source loading aid 5a, 5b and the target loading aid 6a . . . 6c. It would also be conceivable that a joint RFID reading device for the source loading aid 5a, 5b and the target loading aid 6a . . . 6c is provided. In this case, for a reading process the joint RFID reading device can be moved toward the source loading aid 5a, 5b and away from the target loading aid 6a . . . 6c and vice versa. It would also be conceivable that the source loading aid 5a, 5b is moved toward the RFID reading device and the target loading aid 6a . . . 6c is moved away from the RFID reading device and vice versa. This movement can be carried out for example with the help of the conveying device 7.

It is in particular also conceivable that the second sensor system has a third RFID reading device, which is disposed at a movable part of the robot 3. For example, the third RFID reading device can be disposed at the second robot arm 10, as is the case for the first sensor system 11 in the FIG. 1. An RFID reading device disposed at the second robot arm 10, however, can also be part of the first sensor system or form the latter.

The third RFID reading device can be moved toward the source loading aid 5a, 5b in order to acquire the objects 2a . . . 2d contained in the source loading aid 5a, 5b. In this case, the target loading aid 6a is excluded from the reading range of the third RFID reading device. However, the third RFID reading device can also be moved toward the target loading aid 6a . . . 6c in order to acquire the objects 2a . . . 2d contained in the target loading aid 6a . . . 6c. In this case, the source loading aid 5a, 5b is excluded from the reading range of the third RFID reading device.

The reading range of the third RFID reading device can also comprise the holding range A of the robot 3. For an operation of acquiring the objects 2a . . . 2d held within the holding range A of the robot 3, the third RFID reading device is moved away from the source loading aid 5a, 5b and from the target loading aid 6a . . . 6c in order to exclude the source loading aid 5a, 5b and the target loading aid 6a . . . 6c from the reading range of the third RFID reading device.

Entirely analogously, the holding range A of the robot 3 can also be moved into the reading range of the first RFID reading device 14a or into the reading range of the second RFID reading device 14b in order to acquire the objects 2a . . . 2d present within the holding range A. In this case, the source loading aid 5a, 5b and/or the target loading aid 6a . . . 6c can accordingly be moved out of the reading range of the first RFID reading device 14a/second RFID reading device 14b.

It follows from the above in particular that only one single RFID reading device is needed in principle in order to identify the objects 2a . . . 2d located in the source loading aid 5a, 5b, in the target loading aid 6a . . . 6c and within the holding range A.

The objects 2a . . . 2d held within the holding range A of the robot 3 and/or the objects 2a . . . 2d placed by the robot 3 can be ascertained via a subtraction of two reading processes. Means for ascertaining the number and/or the type of objects 2a . . . 2d then need not be provided at the robot 3 itself.

For example, the objects 2a . . . 2d contained in the source loading aid 5a, 5b can be acquired with the help of the first RFID reading device 14a before and after the operation of removing the at least one object 2a . . . 2d. Subsequently, the number and/or the type of the at least one object 2a . . . 2d removed from the source loading aid 5a, 5b can be determined my means of an ascertained difference of the objects 2a . . . 2d acquired during the two reading processes.

It is also conceivable that the objects 2a . . . 2d contained in the target loading aid 6a . . . 6c are acquired with the help of the second RFID reading device 14b before and after the operation of placing the at least one object 2a . . . 2d and that the number and/or the type of the at least one object 2a . . . 2d placed in the target loading aid 6a . . . 6c is determined by means of an ascertained difference of the objects 2a . . . 2d acquired during the two reading processes.

It can generally be provided that the robot 3 is instructed with respect to the removal process to remove an exact number of objects 2a . . . 2d and/or a specific object 2a . . . 2d or specific objects 2a . . . 2d from the source loading aid 5a, 5b. In this way, the running of the picking process is easily plannable and/or predictable. In the normal situation and without occurrence of an unforeseen event, the robot 3 will always remove those objects 2a . . . 2d from the source loading aid 5a, 5b which contribute to completing the picking order.

In principle the outcome of the check according to item e2) is independent of whether the number of removed objects 2a . . . 2d is actually identical with the required number of objects 2a . . . 2d. For example, it can be planned that the robot 3 removes one object 2a . . . 2d each from the source loading aid 5a, 5b and places it in the target loading aid 6a . . . 6c in three steps, i.e. 1+1+1 objects 2a . . . 2d. If the robot 3 in the first step actually gets hold of one object 2a . . . 2d but in the second step of two objects 2a . . . 2d, i.e. 1+2 objects 2a . . . 2d, this nevertheless serves to complete the order. Similarly, the sequence 2+1 objects 2a . . . 2d would complete the order, yet the sequence 2+2 objects 2a . . . 2d for example would not.

The same applies to the types of object/kinds of object. While the robot 3 can for example be instructed to remove a green object 2a . . . 2d from the source loading aid 5a, 5b and place it into the target loading aid 6a . . . 6c, but it actually gets hold of a yellow object 2a . . . 2d and a yellow object 2a . . . 2d is still missing for completing the order, the process for placing the at least one object 2a . . . 2d into the target loading aid 6a . . . 6c need not be aborted or modified. In principle the outcome of the check according to item e2) is thus also independent of whether the kind of the removed objects 2a . . . 2d is actually identical with the required kind of the objects 2a . . . 2d.

As already mentioned, the types of object are not limited to colors, but also other object properties can alternatively or additionally be used for determining a type of object, for example a gray-scale value, a surface structure/a surface pattern, a geometrical shape or dimensions of the object 2a . . . 2d. In particular when using cameras 17 (compare FIG. 2) which yield only gray-scale values, there is, after all, no information on color available. Also the weight of an object 2a . . . 2d can be used as a relevant object property (compare FIG. 3).

However, it is also conceivable that the robot 3 is instructed with respect to the removal process to remove any number of objects 2a . . . 2d and/or any object 2a . . . 2d or any objects 2a . . . 2d from the source loading aid 5a, 5b. This ensures that the removal process can be performed in an easy manner in terms of program technology and/or control technology, as the former is not bound to requirements. A check whether the number and/or the type of an object 2a . . . 2d removed from the source loading aid 5a, 5b contributes to completing a picking order is carried out in this variant in principle only after removal of the objects 2a . . . 2d from the source loading aid 5a, 5b.

The removal can also be limited to a range of numbers. For example, it can be provided that the robot 3 is instructed with respect to the removal process to remove any number of objects 2a . . . 2d within a range of numbers, i.e. for example 1 to 3 objects 2a . . . 2d. Also in this case, the outcome of the check according to item e2) is independent of whether the number of removed objects 2a . . . 2d is actually within the required range. If it is required to remove 1 to 3 objects 2a . . . 2d, but 4 objects 2a . . . 2d are actually grasped, then this serves to complete an order whenever 4 or more objects 2a . . . 2d are still missing in the target loading aid 6a . . . 6c.

The removal can also be limited to a range of types of object/kinds of object. For example, the robot 3 can be instructed to convey green or yellow objects 2a . . . 2d from the source loading aid 5a, 5b into the target loading aid 6a . . . 6c. However, if it actually gets hold of a blue object 2a . . . 2d and a blue object 2a . . . 2d is still missing for completing the order, the process for placing the at least one object 2a . . . 2d into the target loading aid 6a . . . 6c then need not be aborted or modified. In principle the outcome of the check according to item e2) is thus, also in this case, independent of whether the kind of the removed objects 2a . . . 2d is actually identical with the required kind of the objects 2a . . . 2d.

Similarly, the requirement can be limited in terms of location. For example, it can be required to remove an object 2a . . . 2d from an exact position or from an area of the source loading aid 5a, 5b, i.e. for example from the top left corner. The same applies to the operation of placing in the target loading aid 6a . . . 6c. For example, it can be required to place an object 2a . . . 2d at an exact position or in an area of the target loading aid 6a . . . 6c, i.e. for example centered.

Also a combination of the proposed variants is conceivable. Accordingly, the requirement can for example be to remove 1 to 3 yellow or green objects 2a . . . 2d from the top-left-corner area of the source loading aid 5a, 5b and place them in a central area of the target loading aid 6a . . . 6c.

In another variant of the picking method it can be checked whether a comparison of the ascertained number and/or the ascertained type of the at least one object 2a . . . 2d removed from the source loading aid 5a, 5b reveals a deviation to the ascertained number and/or the ascertained type of the at least one object 2a . . . 2d held by the robot 3. If this is the case, it is proceeded in the same way as after the case e2) occurred, and/or an alarm, in particular an alarm message, is emitted to a superordinate computer. In this way, it can be checked whether all objects 2a . . . 2d removed by the robot 3 from the source loading aid 5a, 5b are actually held by the robot 3 or whether a deviation is established and therefore objects 2a . . . 2d have unintentionally dropped off the robot 3 or gone otherwise missing.

Analogously, it can also be checked whether
- a comparison of the ascertained number and/or the ascertained type of the at least one object 2a . . . 2d removed from the source loading aid 5a, 5b reveals a deviation to the ascertained number and/or the ascertained type of the at least one object 2a . . . 2d placed in the target loading aid 6a . . . 6c and/or
- a comparison of the ascertained number and/or the ascertained type of the at least one object 2a . . . 2d held by the robot 3 reveals a deviation to the ascertained number and/or the ascertained type of the at least one object 2a . . . 2d placed in the target loading aid 6a . . . 6c.

Also in these cases, it can be proceeded in the same way as after the case e2) occurred, and/or an alarm, in particular an alarm message, is emitted to a superordinate computer. In this way, it can be checked whether all objects 2a . . . 2d removed by the robot 3 from the source loading aid 5a, 5b and/or all objects 2a . . . 2d held by the robot 3 are actually placed in the target loading aid 6a . . . 6c or whether a deviation is established and therefore objects 2a . . . 2d have dropped off next to the target loading aid 6a . . . 6c.

Figure 2:
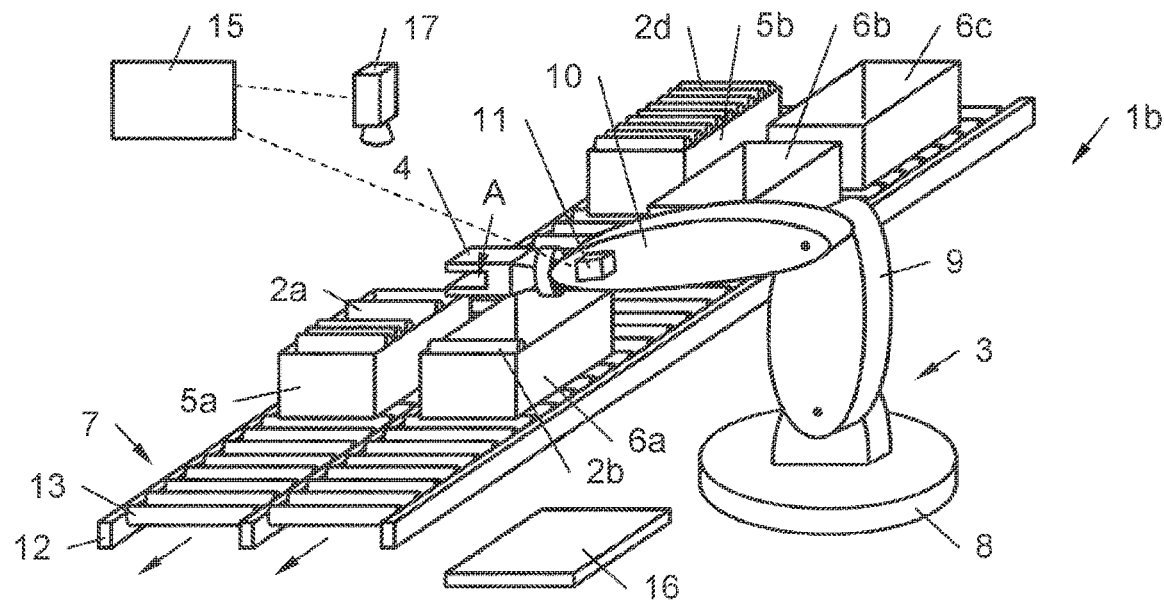
FIG. 2 is similar to FIG. 1, but with a camera for acquiring said objects.

FIG. 2 shows another embodiment of a picking device 1b which is very similar to the picking device 1a depicted in FIG. 1. In contrast to the latter, however, instead of the RFID reading devices 14a, 14b a camera 17 is provided, which acquires the content of the source loading aid 5a, 5b and of the target loading aid 6a . . . 6c. In addition to the camera 17, or as an alternative to it, also a 3D sensor and/or room depth sensor can be provided.

Similarly to using RFID reading devices 14a, 14b the number and/or the type of the objects 2a . . . 2d removed from the source loading aid 5a, 5b, located within the holding range A and/or placed in the target loading aid 6a . . . 6c are ascertained via subtraction of two acquisition processes, in this case by acquiring two images at different points in time and/or in different states of the picking device 1b.

Specifically, this is carried out by
- the number and/or the type of the at least one object 2a . . . 2d removed from the source loading aid 5a, 5b being ascertained by a comparison of an image of a content of the source loading aid 5a, 5b acquired before and an image of a content of the source loading aid 5a, 5b acquired after the removal process and/or
- the number and/or the type of the at least one object 2a . . . 2d placed in the target loading aid 6a . . . 6c being ascertained by a comparison of an image of a content of the target loading aid 6a . . . 6c acquired before and an image of a content of the target loading aid 6a . . . 6c acquired after the placing process and/or
- the number and/or the type of the at least one object 2a . . . 2d held by the robot 3 being ascertained by means of an image acquired of the holding range A of the robot 3.

As to the rest, the same as what has been said in relation to the picking device 1a depicted in the FIG. 1 analogously applies to the picking device 1b.

In particular, it is conceivable also in this embodiment that the second sensor system has camera, which is disposed at a movable part of the robot 3. For example, the camera can be disposed at the second robot arm 10, as is the case for the first sensor system 11 in the FIG. 1. A camera disposed at the second robot arm 10, however, can also be part of the first sensor system or form the latter.

By aligning the camera accordingly, the content of the source loading aid 5a, 5b, of the target loading aid 6a . . . 6c and also of the holding range A can, in turn, be acquired. Also, the holding range A can be moved into the acquisition area of the camera 17 in order to identify the objects 2a . . . 2d present there.

It follows, in turn, from the above that only one single camera 17 is needed in principle in order to identify the objects 2a . . . 2d located in the source loading aid 5a, 5b, in the target loading aid 6a . . . 6c and within the holding range A.

Figure 3:
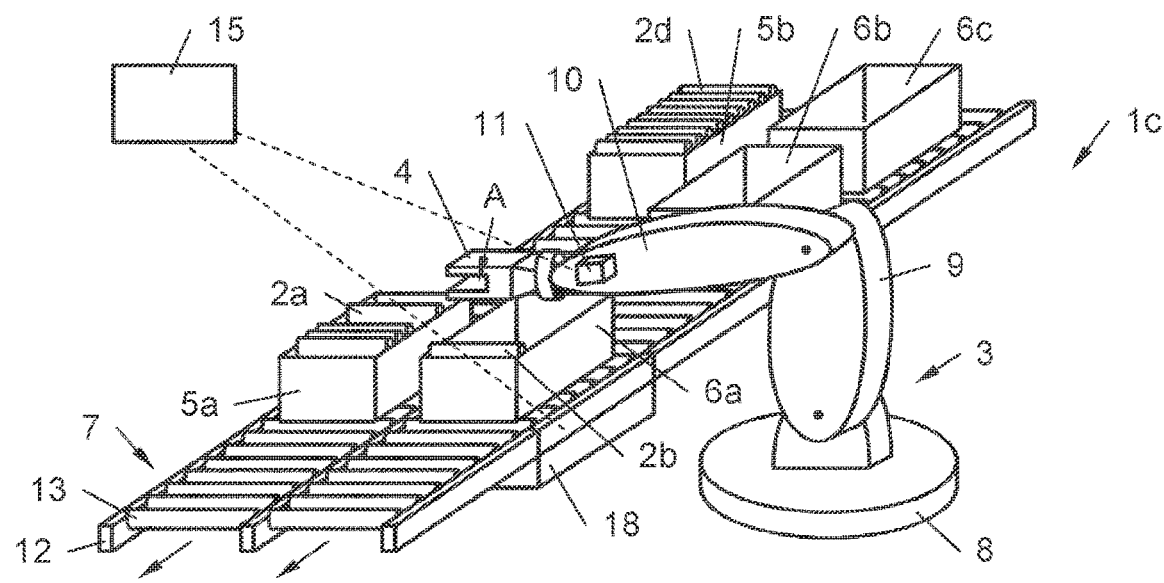
FIG. 3 is similar to FIG. 1, but with a weighing scale for acquiring said objects

FIG. 3 shows another embodiment of a picking device 1c, which is very similar to the picking device 1a depicted in FIG. 1 and also to the picking device 1b depicted in FIG. 2. In contrast to the latter, however, a weighing scale 18 is now provided for the second sensor system, which weighing scale acquires the content of the source loading aid 5a, 5b and of the target loading aid 6a . . . 6c. In this example the weighing scale 18 to that end extends across both conveyor tracks of the conveying device 3, which, while being advantageous, is not mandatory. Another difference is that the picking device 1c has no rectification area 16. Evidently, however, the picking device 1c can have such rectification area 16.

In the picking device 1c depicted in FIG. 3, too, the number and/or the type of the objects 2a . . . 2d removed from the source loading aid 5a, 5b, located within the holding range A and/or placed in the target loading aid 6a . . . 6c can be ascertained via subtraction of two acquisition processes, in this case by acquiring a weight at different points in time and/or in different states of the picking device 1c. The object property relevant for the weighing scale 18, therefore, is the weight of an object 2a . . . 2d.

Specifically, this can be carried out by the source loading aid 5a, 5b being weighed before and after removing the at least one object 2a . . . 2d and the number and/or the type of the at least one object 2a . . . 2d removed from the source loading aid 5a, 5b and subsequently held by the robot 3 within the holding range A being ascertained by means of a measured weight difference. Accordingly, the target loading aid 6a . . . 6c can also be weighed before and after the operation of placing the at least one object 2a . . . 2d, and the number and/or the type of the at least one object 2a . . . 2d placed in the target loading aid 6a . . . 6c is ascertained by means of a measured weight difference.

In principle the described method works with a joint weighing scale 18 for the source loading aid 5a, 5b and the target loading aid 6a . . . 6c. In an advantageous variant of the picking device 1c, however, separate weighing scales for several or one source loading aid 5a, 5b each and several or one target loading aid 6a . . . 6c each are provided.

It is further conceivable that the gravitational force held by the robot 3 is ascertained by an appropriate sensor, which is part of the first or second sensor system. In this way, a weight held by the robot 3 can be measured and the number and/or the type of the at least one object 2a . . . 2d held by the robot 3 be ascertained by means of a measured weight difference. However, it is also conceivable that the source loading aid 5a, 5b or the target loading aid 6a . . . 6c is lifted by the robot 3 in order to determine the weight of the objects 2a . . . 2d contained therein.

A prerequisite for ascertaining the number and/or the type of the objects 2a . . . 2d located in the source loading aid 5a, 5b, in the target loading aid 6a . . . 6c and/or in the holding range A of the robot 3 is that the weight of an object 2a . . . 2d contained in the source loading aid 5a, 5b is known. For example, the former is reported to a superordinate computer or ascertained by the latter upon receiving goods. It can generally be assumed that the objects 2a . . . 2d contained in a source loading aid 5a, 5b is known in principle in terms of type and number in a goods storage system of a known type.

In particular the number and/or the type of the at least one object 2a . . . 2d removed from the source loading aid 5a, 5b and/or object 2a . . . 2d placed in the target loading aid 6a . . . 6c and/or object 2a . . . 2d held by the robot 3 is ascertained by seeking a combination of objects 2a . . . 2d contained in the source loading aid 5a, 5b whose total weight is essentially equal to the weight difference.

The total number of objects 2a . . . 2d which can be removed by the robot 3 from the source loading aid 5a, 5b during a removal process can be used as a basis for this computation. If this total number is not known, a total number of five objects 2a . . . 2d—assuming that the robot 3 cannot remove more objects 2a . . . 2d from the source loading aid 5a, 5b—can be used as a basis for the computation.

If the objects 2a . . . 2d in the source loading aid 5a, 5b are homogeneous and thus all have the same weight, the number of the objects 2a . . . 2d removed from the source loading aid 5a, 5b and/or the number of the objects 2a . . . 2d placed in the target loading aid 6a . . . 6c and/or the number and/or the type of the objects 2a . . . 2d held by the robot can be ascertained by means of a division of the measured weight difference by the weight of one object 2a . . . 2d.

In an advantageous variant of the proposed method, accordingly, the weight difference is divided by the total weight of every combination of objects 2a . . . 2d contained in the source loading aid 5a, 5b up to a total number of five objects 2a . . . 2d or up to a total number of objects 2a . . . 2d which can be removed by the robot 3 from the source loading aid 5a, 5b during a removal process. The sought combination is subsequently the one allocated the value closest to one.

In order to ensure that the ascertained quotient is sufficiently close to one and the ascertained result is therefore certain, it is proceeded as upon occurrence of the case e2) if the value closest to one has a deviation above a first threshold. This means that the process for placing an object 2a . . . 2d in the target loading aid 6a . . . 6c will then be aborted or modified.

For the same purpose the distance to the quotient which is second-closest to one can additionally or alternatively be ascertained. If the distance is too small, it cannot be stated with certainty which of the two quotients (namely the quotient closest or the one second-closest to one) is the right one, i.e. specifies the objects actually removed from the source loading aid. If the distance is sufficiently large, the quotient closest to one will actually specify the objects 2a . . . 2d removed from the source loading aid 5a, 5b. Accordingly, it is proceeded in the same way as upon occurrence of the case e2) if the value closest to one has a deviation from the second-closest value which is below a second threshold.

It is also particularly advantageous if the total weight of every combination of objects 2a . . . 2d up to a total number of five objects 2a . . . 2d or up to a total number of objects 2a . . . 2d which can be removed by the robot 3 from the source loading aid 5a, 5b during a removal process is different. In this way it is ensured that every combination of objects 2a . . . 2d has an unambiguous total weight and there are no combinations of objects 2a . . . 2d which have (essentially) the same total weight. The objects 2a . . . 2d removed from the source loading aid 5a, 5b, located within the holding range A and/or placed in the target loading aid 6a ... 6c can thus be unambiguously identified. However, in principle the presented picking method also works if not every combination of objects 2a ... 2d has an unambiguous total weight. If applicable, in this case troubleshooting according to the case e2) is to be performed.

A trivial case for unambiguous total weights is given whenever the source loading aid 5a, 5b contains only one type of objects 2a ... 2d. The homogeneous storage of the objects 2a ... 2d in the source loading aids 5a, 5b, however, is also of advantage for the picking devices 1a and 1b depicted in the FIGS. 1 and 2, as then ascertaining a type of an object 2a ... 2d will be obsolete during the operation of picking, but only the number of the objects 2a ... 2d removed from the source loading aid 5a, 5b, present in the holding range A of the robot 3 and/or placed in the target loading aid 6a ... 6c needs be ascertained.

In a particularly advantageous variant of the picking device 1a ... 1c (configured in reality) the robot 3 is equipped with three vacuum suction grippers, and the first sensor system 11 comprises an ultrasonic sensor and three vacuum sensors, using which (only) the state of occupancy of the holding range A of the robot 3 by at least one object 2a ... 2d can be ascertained. The second sensor system comprises two separate weighing scales 18, a first weighing scale for weighing the source loading aid 5a, 5b and a second weighing scale for weighing the target loading aid 6a ... 6c. The second sensor system is therefore stationary and acquires the weight of the source loading aid 5a, 5b and the objects 2a ... 2d contained therein and the weight of the target loading aid 6a ... 6c and the objects 2a ... 2d contained therein. The picking device 1a ... 1c comprises also a camera and/or a 3D system in order to define the removal position (gripping position)/placing position for the robot 3 but not in order to establish a number/type of the removed objects 2a ... 2d. Finally the picking device 1a ... 1c also has a conveying device 7 for transporting the source loading aid 5a, 5b into a and out of a range of action of the robot 3 and for transporting the target loading aid 6a ... 6c into the and out of the range of action of the robot 3.

For the removal process the robot 3 is instructed to remove a specific object 2a ... 2d or specific objects 2a ... 2d from the source loading aid 5a, 5b and thus an exact number of objects 2a ... 2d from the source loading aid 5a, 5b. The source loading aid 5a, 5b is weighed before and after the operation of removing the at least one object 2a ... 2d, and the number of the objects 2a ... 2d removed from the source loading aid 5a, 5b is ascertained by means of a measured weight difference. Similarly, the target loading aid 6a ... 6c is also weighed before and after the operation of placing the at least one object 2a ... 2d, and the number of the objects 2a ... 2d placed in the target loading aid 6a ... 6c is ascertained by means of a measured weight difference. As only one type of objects 2a ... 2d is contained in the source loading aid 5a, 5b in the exemplary embodiment, it is sufficient to that end to divide the respective measured weight difference by the (known) weight of an individual object 2a ... 2d. However, it would of course also be conceivable that the number and/or the type of the at least one object 2a ... 2d removed from the source loading aid 5a, 5b and/or object 2a ... 2d placed in the target loading aid 6a ... 6c is ascertained using the described device by seeking a combination of objects 2a ... 2d contained in the source loading aid 5a, 5b whose total weight is essentially equal to the weight difference.

If the case e1) occurs in the method for picking goods and/or objects 2a ... 2d, it is continued directly with step a). If the case e2) occurs, all objects 2a ... 2d held by the robot 3 are placed in the source loading aid 5a, 5b, and it is continued with step a).

Generally the position at which an object 2a ... 2d is removed from the source loading aid 5a, 5b and the position at which an object 2a ... 2d is placed in the target loading aid 6a ... 6c, and also the position at which an object 2a ... 2d is picked up from a rectification area 16, can in all presented variants be determined with the help of a sensor system (for example a camera and/or a 3D sensor/3D detection system). Even the removal process or placing process themselves can be monitored with the help of a camera and/or a 3D sensor/3D detection system. The camera and/or the 3D sensor/3D detection system can be part of the first sensor system 11 or of the second sensor system (compare the camera 11 and the camera 17 in the FIG. 2). The camera and/or the 3D sensor/3D detection system, however, can also form an independent third sensor system. In the latter case, the camera and/or the 3D sensor/3D detection system are intended to define the removal position (gripping position) in the source loading aid 5a and/or placing position in the target loading aid 6a but not to establish the number/type of the removed objects 2a ... 2d.

Figure 4:
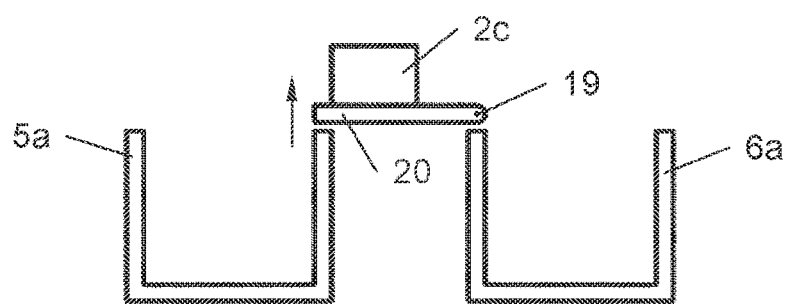
FIG. 4 shows an example of a movable flap disposed between a source loading aid and a target loading aid.

FIG. 4 shows an example of a flap disposed between a source loading aid 5a and a target loading aid 6a and swivelable around an axis of rotation 19. In this way, an object 2c which inadvertently dropped off the robot 3 can be conveyed in a targeted manner into the target loading aid 6a by swiveling up the flap 20. To that end the flap 20 can have its own swivel drive, or the operation of swiveling up the flap 20 is carried out by the robot 3 itself. Advantageously, the object 2c (which is in some circumstances difficult to pick up/grip) need not be seized by the gripper 4 to that end.

It is also conceivable that the flap 20 is alternatively or additionally inclinable toward the source loading aid 5a. It is further conceivable that the flap 20 is alternatively or additionally inclinable toward a placing position/a rectification area 16 and/or a container placed there. It is further conceivable that the horizontally-aligned flap 20 itself forms the rectification area 16.

Moreover it is conceivable that a fixed, level and horizontal connecting surface is disposed between the source loading aid 5a and the target loading aid 6a, which forms in particular the rectification area 16, or that a fixed connecting surface inclined toward the source loading aid 5a, a fixed connecting surface inclined toward the target loading aid 6a or a fixed connecting surface inclined toward a placing position/a rectification area 16 is disposed. In this way, objects 2c which inadvertently dropped off the robot 3 automatically slide to one of to the required locations. The connecting surface can also extend circularly around the source loading aid 5a and/or circularly around the target loading aid 6a and/or circularly around a container disposed at the rectification area 16 and encircle the latter or the former.

If an object 2c drops onto the connecting surface or flap 20, a modification of the process for placing the at least one object 2c into the target loading aid 6a could comprise the operation of picking up the object 2c from the connecting surface or the operation of swiveling up the flap 20. This also applies if the connecting surface or the flap 20 itself forms the rectification area 16 and an object 2c can be intentionally placed there by the robot 3. A modification of the process for placing the at least one object 2c into the target loading aid 6a could then also comprise the (intentional) operation of placing an object 2c on the inclined connecting surface (slide).

The area of the connecting surface and/or flap 20 can be monitored with the help of a sensor system (e.g. a camera and/or a 3D sensor/3D detection system and/or a weighing scale). In this way, a position, location, number and kind of the objects 2c which dropped off the robot 3 can be determined. The camera and/or the 3D sensor/3D detection system can be part of the first or second sensor system (compare the camera 17 in FIG. 2), or they can form an independent third sensor system.

The exemplary embodiments show possible embodiment variants of devices 1a . . . 1c in accordance with the invention, and it should be noted in this respect that the invention is not restricted to these particular depicted embodiment variants of it, but that rather also various combinations of the individual embodiment variants are possible whose derivation lies within the ability of the person skilled in the art in this technical field.

In particular the variant embodiments presented in the FIGS. 1 to 3 can be combined as desired. For example, the second sensor system of a picking device 1a . . . 1c can comprise at least one RFID reading device 14a, 14b and/or at least one camera 17 and/or at least one weighing scale 18. The second sensor system can be only stationary, disposed only on the robot 3 or form a mixed form. The same applies also to the first sensor system 11 of a picking device 1a . . . 1c, which can equally comprise an RFID reading device 14a, 14b and/or a camera 17 and/or a weighing scale 18. The first sensor system 11 can be only stationary, disposed only on the robot 3 or form a mixed form. The first sensor system 11 can thus in particular be disposed separate from the robot 3 but within its range of action. The first sensor system 11 can be formed for example by a camera system, which is disposed stationary in order to acquire the presence of at least one object 2a . . . 2d at the robot 3 and/or gripper. Preferably, the first sensor system 11 is, however, disposed at the robot 3, in particular at a movable robot arm or at a gripper. The second sensor system 14a, 14b, 17, 18 can be different from the first sensor system 11 or be designed analogously.

In the figures reference was made to case-shaped source loading aids 5a, 5b and target loading aids 6a . . . 6c. These can, however, also be configured differently, for example as trays. Within this meaning the terms "pick-up process" and "pick-up position" can be used synonymously with "removal process" and "removal position". Also the terms "gripping process" and "gripping position" are equivalents in this context. It would also be conceivable that the case-shaped source loading aids 5a, 5b and/or target loading aids 6a . . . 6c (e.g. cartons) are not transported directly on the conveyor rollers 13 but stand on trays.

It should further be noted that a picking process can also involve several source loading aids 5a, 5b and/or several target loading aids 6a . . . 6c. For example, the robot 3 can load a target loading aid 6a . . . 6c with objects 2a . . . 2d from several source loading aids 5a, 5b, load several target loading aids 6a . . . 6c with objects 2a . . . 2d from only one source loading aid 5a, 5b or also load several target loading aids 6a . . . 6c with objects 2a . . . 2d from several source loading aids 5a, 5b.

Generally, the source loading aids 5a, 5b and/or target loading aids 6a . . . 6c can be segmented and/or subdivided. For example, the source loading aids 5a, 5b and/or target loading aids 6a . . . 6c can have separating walls, whereby several compartments are created which are (structurally) separated from one another. For the purposes of the invention these compartments can also be understood as several individual containers coupled to one another (in a fixed manner). That means that the procedure when removing objects 2a . . . 2d from a source loading aid 5a, 5b having several compartments is identical with the procedure when removing objects 2a . . . 2d from several source loading aids 5a, 5b each having one compartment. In an equivalent manner, the procedure when placing objects 2a . . . 2d in a target loading aid 6a . . . 6c having several compartments is identical with the procedure when placing objects 2a . . . 2d in several source loading aids 6a, 5b each having one compartment. In particular the objects 2a . . . 2d in the individual compartments can be homogeneous (i.e. there are objects 2a . . . 2d of only one type in a compartment) or mixed (i.e. there are objects 2a . . . 2d of several types in a compartment).

It should also be noted in this context that the picking process can be carried out in particular with the assistance of several source loading aids 5a, 5b and several target loading aids 6a . . . 6c. In this case, at one point in time there can be one source loading aid 5a, 5b and one target loading aid 6a . . . 6c each within the range of action of the robot 3, or at one point in time there are several source loading aids 5a, 5b and/or target loading aids 6a . . . 6c within the range of action of the robot 3.

Independent of the claimed invention, it is also possible that only a second sensor system is provided and the first sensor system is obsolete, as the check whether or not an object 2a . . . 2d is present within the holding range A of the robot 3 can in principle also be performed by the second sensor system.

The scope of protection, however, is determined by the claims. In this context, the description and the drawings are to be adduced for construing the claims. Individual features or feature combinations from the different exemplary embodiments shown and described may represent independent inventive solutions. The object underlying the independent inventive solutions may be gathered from the description.

In particular, it should be noted that the depicted devices 1a . . . 1c may in reality also include more or fewer parts than depicted and are sometimes depicted in a strongly simplified manner.

Finally, as a matter of form, it should be noted that for ease of understanding of the structure, the depicted devices 1a . . . 1c as well as their components are moreover partially not depicted to scale and/or are enlarged and/or are reduced in size.

LIST OF REFERENCE NUMBERS

1a . . . 1c device for picking goods
2a . . . 2d object
3 robot
4 means for the operation of removing/placing at least one object (gripper)
5a, 5b source loading aid
6a . . . 6c target loading aid
7 provisioning device/conveying device
8 robot base
9 first robot arm
10 second robot arm
11 first sensor system
12 frame profile
13 conveyor roller
14a, 14b RFID reading device 15 control
16 placing position/rectification area
17 camera
18 weighing scale
19 axis of rotation
20 flap
A holding range

The invention claimed is:

1. A method for picking objects (2a . . . 2d), comprising the steps:
   a) removing at least one object (2a . . . 2d) from a source loading aid (5a, 5b) using a robot (3),
   b) placing the at least one object (2a . . . 2d) in a target loading aid (6a . . . 6c) using said robot (3),
   c) after removing the object (2a . . . 2d) from the source loading aid (5a, 5b), conducting a check using a first sensor system (11) whether at least one object (2a . . . 2d) is held by the robot (3),
   d) ascertaining a number of the at least one removed object (2a . . . 2d) using a second sensor system (14a, 14b, 17, 18), and
   e) aborting or modifying the process for placing the at least one object (2a . . . 2d) into the target loading aid (6a . . . 6c) if the check using the first sensor system (11) reveals that
   at least one object (2a . . . 2d) is held by the robot (3), but a check carried out using the second sensor system (14a, 14b, 17, 18) reveals that the number of the at least one object (2a . . . 2d) removed from the source loading aid (5a, 5b) is larger than the difference between a desired number and an actual number of the objects contained in the target loading aid, wherein the desired number of objects (2a . . . 2d) in the target loading aid (6a . . . 6c) is defined by a picking order.

2. The method according to claim 1, further comprising:
   aborting or modifying the process for placing the at least one object (2a . . . 2d) into the target loading aid (6a . . . 6c) if the check using the first sensor system (11) reveals that no object (2a . . . 2d) is held by the robot (3) and directly continuing the method with step a).

3. The method according to claim 1, further comprising:
   in the step e) placing all objects (2a . . . 2d) held by the robot (3) in the source loading aid (5a, 5b) and continuing the method with step a).

4. The method according to claim 1, further comprising:
   in the step e) placing all objects (2a . . . 2d) held by the robot (3) at a placing position (16) different from the source loading aid (5a, 5b) and from the target loading aid (6a . . . 6c),
   seizing and placing an object (2a . . . 2d) intended for the target loading aid (6a . . . 6c) in the target loading aid (6a . . . 6c),
   seizing and placing an object (2a . . . 2d) not intended for the target loading aid (6a . . . 6c) in the source loading aid (5a, 5b), and
   subsequently continuing the method with step a).

5. The method according to claim 1, further comprising:
   in the step e) placing all objects (2a . . . 2d) held by the robot (3) in the target loading aid (6a . . . 6c),
   removing from the target loading aid (6a . . . 6c) and placing in the source loading aid (5a, 5b) an object (2a . . . 2d) not intended for the target loading aid (6a . . . 6c), and
   subsequently continuing the method with step a).

6. The method according to claim 1, further comprising:
   instructing the robot (3) with respect to the removal process to remove an exact number of objects (2a . . . 2d) from the source loading aid (5a, 5b).

7. The method according to claim 1, further comprising:
   instructing the robot (3) with respect to the removal process to remove any number of object (2a . . . 2d) from the source loading aid (5a, 5b).

8. The method according to claim 1, further comprising:
   instructing the robot (3) with respect to the removal process to remove a specific object (2a . . . 2d) or specific objects (2a . . . 2d) from the source loading aid (5a, 5b).

9. The method according to claim 1, further comprising:
   instructing the robot (3) with respect to the removal process to remove any object (2a . . . 2d) or any objects (2a . . . 2d) from the source loading aid (5a, 5b).

10. The method according to claim 1, further comprising:
    instructing the robot (3) with respect to the removal process to remove the at least one object (2a . . . 2d) at an exact position from the source loading aid (5a, 5b) or place the at least one object (2a . . . 2d) at an exact position in the target loading aid (6a . . . 6c).

11. The method according to claim 1, further comprising:
    instructing the robot (3) with respect to the removal process to remove the at least one object (2a . . . 2d) at any position from the source loading aid (5a, 5b) or place it the at least one object (2a . . . 2d) at any position in the target loading aid (6a . . . 6c).

12. The method according to claim 1, wherein in the source loading aid (5a, 5b) contains only one type of objects (2a . . . 2d).

13. The method according to claim 1, further comprising:
    carrying out the check using the first sensor system (11) only once per run through the steps a) to e).

14. The method according to claim 1, further comprising:
    carrying out the check using the first sensor system (11) several times per run through the steps a) to e).

15. The method according to claim 1, further comprising:
    in the step d) also ascertaining a type of the at least one removed object (2a . . . 2d) using the second sensor system (14a, 14b, 17, 18) and
    aborting or modifying the process for placing the at least one object (2a . . . 2d) into the target loading aid (6a . . . 6c) if the check carried out using the second sensor system (14a, 14b, 17, 18) in the step e) also reveals that the type of the at least one object (2a . . . 2d) removed from the source loading aid (5a, 5b) does not contribute to completing the picking order.

16. The method according to claim 1, further comprising:
    equipping the second sensor system with at least one of a camera (17), a 3D sensor, and a 3D detection system,
    ascertaining the number, the type, or the number and the type of the at least one object (2a . . . 2d) removed from the source loading aid (5a, 5b) by a comparison of an image of a content of the source loading aid (5a, 5b) acquired before and of an image of a content of the source loading aid (5a, 5b) acquired after the removal process; or
    ascertaining the number, the type, or the number and the type of the at least one object (2a . . . 2d) placed in the target loading aid (6a . . . 6c) by a comparison of an image of a content of the target loading aid (6a . . . 6c) acquired before and of an image of a content of the target loading aid (6a . . . 6c) acquired after the placing process; or ascertaining the number, the type, or the number and the type of the at least one object (2a . . . 2d) held by the robot (3) using an image acquired of the holding range (A) of the robot (3).

17. The method according to claim 15, further comprising:
in the step e) placing all objects (2a . . . 2d) held by the robot (3) in the source loading aid (5a, 5b) and
continuing the method with step a) or
emitting an alarm if
a comparison of the ascertained number, the ascertained type, or the ascertained number and the ascertained type of the at least one object (2a . . . 2d) removed from the source loading aid (5a, 5b) reveals a deviation to the ascertained number, the ascertained type, or the ascertained number and the ascertained type of the at least one object (2a . . . 2d) held by the robot (3); or
a comparison of the ascertained number, the ascertained type, or the ascertained number and the ascertained type of the at least one object (2a . . . 2d) removed from the source loading aid (5a, 5b) reveals a deviation to the ascertained number, the ascertained type, or the ascertained number and the ascertained type of the at least one object (2a . . . 2d) placed in the target loading aid (6a . . . 6c); or
a comparison of the ascertained number, the ascertained type, or the ascertained number and the ascertained type of the at least one object (2a . . . 2d) held by the robot (3) reveals a deviation to the ascertained number, the ascertained type, or the ascertained number and the ascertained type of the at least one object (2a . . . 2d) placed in the target loading aid (6a . . . 6c).

18. The method according to claim 1, further comprising:
equipping the objects (2a . . . 2d) with RFID tags, and
reading out a piece of information from the RFID tag using a first RFID reading device (14a) of the second sensor system for the RFID tags having a reading range comprising the source loading aid (5a, 5b) but excluding the target loading aid (6a . . . 6c) and a holding range (A) of the robot (3), and
ascertaining the number, the type, or the number and the type of the at least one object (2a . . . 2d) removed from the source loading aid (5a, 5b) using the piece of information read out from the RFID tag using the first RFID reading device (14a); or
reading out a piece of information from the RFID tag using a second RFID reading device (14b) of the second sensor system for the RFID tags having a reading range comprising the target loading aid (6a . . . 6c) but excluding the source loading aid (5a, 5b) and a holding range (A) of the robot (3), and
ascertaining the number, the type, or the number and the type of the at least one object (2a . . . 2d) placed into the target loading aid (6a . . . 6c) using the piece of information read out from the RFID tag using the second RFID reading device (14b); or
reading out a piece of information from the RFID tag using a third RFID reading device of the second sensor system for the RFID tags having a reading range comprising a holding range (A) of the robot (3) but excluding the source loading aid (5a, 5b) and the target loading aid (6a . . . 6c), and
ascertaining the number, the type, or the number and the type of the at least one object (2a . . . 2d) held by the robot (3) using the piece of information read out from the RFID tag using the third RFID reading device.

19. The method according to claim 18, further comprising:
acquiring the objects (2a . . . 2d) contained in the source loading aid (5a, 5b) using the first RFID reading device (14a) in a first reading process before the operation of removing the at least one object (2a . . . 2d),
acquiring the objects (2a . . . 2d) contained in the source loading aid (5a, 5b) using the first RFID reading device (14a) in a second reading process after the operation of removing the at least one object (2a . . . 2d), and
determining the number, the type, or the number and the type of the at least one object (2a . . . 2d) removed from the source loading aid (5a, 5b) using an ascertained difference of the objects (2a . . . 2d) acquired during the first and second reading processes; or
acquiring the objects (2a . . . 2d) contained in the target loading aid (6a . . . 6c) using the second RFID reading device (14b) in a first reading process before the operation of placing the at least one object (2a . . . 2d), and
acquiring the objects (2a . . . 2d) contained in the target loading aid (6a . . . 6c) using the second RFID reading device (14b) in a second reading process after the operation of placing the at least one object (2a . . . 2d), and
determining the number, the type, or the number and the type of the at least one object (2a . . . 2d) placed in the target loading aid (6a . . . 6c) using an ascertained difference of the objects (2a . . . 2d) acquired during the first and second reading processes.

20. The method according to claim 18, further comprising:
moving a third RFID reading device for RFID tags disposed at a moving part (10) of the robot (3)
toward the source loading aid (5a, 5b) in order to acquire the objects (2a . . . 2d) contained in the source loading aid (5a, 5b); or
toward the target loading aid (6a . . . 6c) in order to acquire the objects (2a . . . 2d) contained in the target loading aid (6a . . . 6c); or
away from the source loading aid (5a, 5b) and from the target loading aid (6a . . . 6c) in order to acquire the objects (2a . . . 2d) held by the robot (3) in the holding range (A).

21. The method according to claim 18, further comprising:
storing in an RFID tag the type of that object (2a . . . 2d) at or in which the RFID tag is disposed; or
storing in said RFID tag a reference into a database in which said type is stored.

22. The method according to claim 18, further comprising:
ascertaining by the first sensor system (11) only a state of occupancy of the holding range (A) of the robot (3) by at least one object (2a . . . 2d).

23. The method according to claim 15, further comprising:
weighing the source loading aid (5a, 5b) using a weighing scale (18) before and after the operation of removing the at least one object (2a . . . 2d), wherein the second sensor system comprises the weighing scale, and
ascertaining the number, the type, or the number and the type of the at least one object (2a . . . 2d) removed from the source loading aid (5a, 5b) using a measured weight difference; or
weighing the target loading aid (6a . . . 6c) using a weighing scale (18) before and after the operation of placing the at least one object (2a ... 2d), wherein the second sensor system comprises the weighing scale, and ascertaining the number, the type, or the number and the type of the at least one object (2a ... 2d) placed in the target loading aid (6a ... 6c) using a measured weight difference; or measuring a weight held by the robot (3) before and after the operation of removing the at least one object (2a ... 2d), wherein the second sensor system comprises the weighing scale, and ascertaining the number, the type, or the number and the type of the at least one object (2a ... 2d) held by the robot (3) using a measured weight difference.

24. The method according to claim 23, wherein
a weight of an object (2a ... 2d) of a type contained in the source loading aid (5a, 5b) is known and the method further comprises:

ascertaining the number, the type, or the number and the type of the at least one object (2a ... 2d) removed from at least one of the source loading aid (5a, 5b), object (2a ... 2d) placed in the target loading aid (6a ... 6c), and object (2a ... 2d) held by the robot (3) by seeking a combination of objects (2a ... 2d) contained in the source loading aid (5a, 5b) whose total weight is essentially equal to the measured weight difference.

25. The method according to claim 24, wherein the total weight of every combination of objects (2a ... 2d) up to a total number of five objects (2a ... 2d) or up to a total number of objects (2a ... 2d) which can be removed by the robot (3) from the source loading aid (5a, 5b) during a removal process is different.

26. The method according to claim 24, further comprising:
dividing the measured weight difference by the total weight of every combination of objects (2a ... 2d) contained in the source loading aid (5a, 5b) up to a total number of five objects (2a ... 2d) or up to a total number of objects (2a ... 2d) which can be removed by the robot (3) from the source loading aid (5a, 5b) during a removal process, and the sought combination is the one allocated a value closest to one.

27. The method according to claim 26, further comprising:
in the step e) directly continuing the method with step a) if the value closest to one has a deviation from one which is above a first threshold or a deviation from a second-closest value which is below a second threshold.

28. A device (1a ... 1c) for picking objects (2a ... 2d), comprising:
a robot (3) having means (4) for removing at least one object (2a ... 2d) from a source loading aid (5a, 5b) and for placing the at least one object (2a ... 2d) in a target loading aid (6a ... 6c),
a provisioning device (7) for provisioning the source loading aid (5a, 5b) and the target loading aid (6a ... 6c) within a range of action of the robot (3),
a first sensor system (11) for checking whether at least one object (2a ... 2d) is held by the robot (3),
a second sensor system (14a, 14b, 17, 18) for ascertaining a number of the at least one removed object (2a ... 2d), and
a control (15) configured to abort or modify a process for placing the at least one object (2a ... 2d) into the target loading aid (6a ... 6c) if a check using the first sensor system (11) reveals that at least one object (2a ... 2d) is held by the robot (3), but a check carried out using the second sensor system (14a, 14b, 17, 18) reveals that the number of the at least one object (2a ... 2d) removed from the source loading aid (5a, 5b) is larger than the difference between a desired number and an actual number of the objects contained in the target loading aid, wherein the desired number of objects (2a ... 2d) in the target loading aid (6a ... 6c) is defined by a picking order.

29. The device (1a ... 1c) according to claim 28, wherein the second sensor system (14a, 14b, 17, 18) is also configured to ascertain a type of the at least one removed object (2a ... 2d) and the control (15) is also configured to abort or modify the process for placing the at least one object (2a ... 2d) into the target loading aid (6a ... 6c) if the check carried out using the second sensor system (14a, 14b, 17, 18) reveals that the type of the at least one object (2a ... 2d) removed from the source loading aid (5a, 5b) does not contribute to completing the picking order.

30. The device (1a ... 1c) according to claim 28, wherein the means for the operation of removing and for the operation of placing the at least one object (2a ... 2d) are formed by a pliers-like or hand-like gripper (4) or by a vacuum gripper or by any combination of these grippers.

31. The device (1a ... 1c) according to claim 28, wherein at least one of the first sensor system (11) and the second sensor system (14a, 14b, 17, 18) is disposed at the robot (3).

32. The device (1a ... 1c) according to claim 28, wherein the second sensor system (14a, 14b, 17, 18) is stationary and acquires at least one of the source loading aid (5a, 5b) and target loading aid (6a ... 6c).

33. The device (1a ... 1c) according to claim 28, wherein the first sensor system (11) comprises:
at least one of an ultrasonic sensor, an RFID reading device, a camera, a weighing scale, and a force sensor.

34. The device (1a ... 1c) according to claim 28, wherein the second sensor system comprises:
an RFID reading device (14a, 14b) for RFID tags, whose reading range comprises at least one of the source loading aid (5a, 5b), the target loading aid (6a ... 6c), and of a holding range (A) of the robot (3); or
at least one of a camera (A), a 3D-Sensor, and a 3D detection system configured for acquisition of an image of a content of the source loading aid (5a, 5b), of the target loading aid (6a ... 6c) or of a holding range (A) of the robot (3); or
at least a weighing scale (18) for weighing the source loading aid (5a, 5b), the target loading aid (6a ... 6c) or a holding range (A) of the robot (3).

35. The device (1a ... 1c) according to claim 28, wherein the provisioning device has a conveying device (7) for supplying the source loading aid (5a, 5b) into a range of action of the robot (3) and for transporting the target loading aid (6a ... 6c) out of the range of action of the robot (3).

36. The device (1a ... 1c) according to claim 28, wherein the robot (3) is equipped with a vacuum suction gripper and the first sensor system (11) comprises a vacuum sensor.

37. The device (1a ... 1c) according to claim 28, wherein the control (15) is also configured to abort or modify the process for placing the at least one object (2a ... 2d) into the target loading aid (6a ... 6c) if the check using the first sensor system (11) reveals that no object (2a ... 2d) is held by the robot (3).

38. The device (1a ... 1c) according to claim 28, further comprising:
- a fixed, level and horizontal connecting surface disposed between the source loading aid (5a, 5b) and the target loading aid (6a ... 6c); or
- a fixed connecting surface disposed between the source loading aid (5a, 5b) and the target loading aid (6a ... 6c) and inclined toward the source loading aid (5a, 5b) or the target loading aid (6a ... 6c); or
- a fixed connecting surface disposed between the source loading aid (5a, 5b) and the target loading aid (6a ... 6c) and inclined toward a placing position (16); or
- a movable connecting surface or flap (20) disposed between the source loading aid (5a, 5b) and the target loading aid (6a ... 6c) and inclinable toward the source loading aid (5a, 5b) or toward the target loading aid (6a ... 6c) or toward a placing position (16).

39. The device (1a ... 1c) according to claim 38, further comprising a sensor system acquiring the connecting surface or flap (20).

40. A computer program product having a computer program stored on the computer program product, which is loadable on a computer (15) of a device (1a ... 1c) and executes there a method for picking objects (2a ... 2d) if the computer program is executed there, the device comprising:
- a robot (3) having means (4) for removing at least one object (2a ... 2d) from a source loading aid (5a, 5b) and for placing the at least one object (2a ... 2d) in a target loading aid (6a ... 6c),
- a provisioning device (7) for provisioning the source loading aid (5a, 5b) and the target loading aid (6a ... 6c) within a range of action of the robot (3),
- a first sensor system (11) for checking whether at least one object (2a ... 2d) is held by the robot (3),
- a second sensor system (14a, 14b, 17, 18) for ascertaining a number of the at least one removed object (2a ... 2d), and
- a control (15) configured to abort or modify a process for placing the at least one object (2a ... 2d) into the target loading aid (6a ... 6c) if a check using the first sensor system (11) reveals that at least one object (2a ... 2d) is held by the robot (3), but a check carried out using the second sensor system (14a, 14b, 17, 18) reveals that the number of the at least one object (2a ... 2d) removed from the source loading aid (5a, 5b) is larger than the difference between a desired number and an actual number of the objects contained in the target loading aid, wherein the desired number of objects (2a ... 2d) in the target loading aid (6a ... 6c) is defined by a picking order, and the method comprising the steps:
a) removing at least one object (2a ... 2d) from the source loading aid (5a, 5b) using the robot (3),
b) placing the at least one object (2a ... 2d) in the target loading aid (6a ... 6c) using said robot (3),
c) after removing the object (2a ... 2d) from the source loading aid (5a, 5b), conducting the check using the first sensor system (11) whether at least one object (2a ... 2d) is held by the robot (3),
d) ascertaining the number of the at least one removed object (2a ... 2d) using the second sensor system (14a, 14b, 17, 18), and
e) aborting or modifying the process for placing the at least one object (2a ... 2d) into the target loading aid (6a ... 6c) if the check using the first sensor system (11) reveals that at least one object (2a ... 2d) is held by the robot (3), but the check carried out using the second sensor system (14a, 14b, 17, 18) reveals that the number of the at least one object (2a ... 2d) removed from the source loading aid (5a, 5b) is larger than the difference between the desired number and the actual number of the objects contained in the target loading aid, wherein the desired number of objects (2a ... 2d) in the target loading aid (6a ... 6c) is defined by the picking order.

41. The computer program product according to claim 40, wherein the method executed on the computer further comprises aborting or modifying the process for placing the at least one object (2a ... 2d) into the target loading aid (6a ... 6c) if the check using the first sensor system (11) reveals that no object (2a ... 2d) is held by the robot (3).

* * * * *

UNITED STATES PATENT AND TRADEMARK OFFICE
CERTIFICATE OF CORRECTION

PATENT NO. : 11,559,899 B2  
APPLICATION NO. : 16/476154  
DATED : January 24, 2023  
INVENTOR(S) : Beinhofer et al.

Page 1 of 1

It is certified that error appears in the above-identified patent and that said Letters Patent is hereby corrected as shown below:

In the Claims

In Claim 11, (Column 26, Line 27) after "place" delete "it"  
In Claim 16, (Column 26, Line 49) change "claim 1" to --claim 15--  
In Claim 18, (Column 27, Line 33) change "claim 1" to --claim 15--  
In Claim 34, (Column 30, Line 42) after "and" delete "of" (first-occurrence)

Signed and Sealed this  
Seventh Day of March, 2023

Katherine Kelly Vidal  
*Director of the United States Patent and Trademark Office*